United States Patent
Chesnau et al.

(10) Patent No.: US 7,692,406 B2
(45) Date of Patent: Apr. 6, 2010

(54) BATTERY-CHARGER DEVICE WITH IMPROVED STABILITY

(75) Inventors: David Chesnau, Bayern (DE); Giacomo Mercadante, Palermo (IT); Patrizia Milazzo, Sant'Agata li Battiati (IT); Christopher Bernard, Claix (FR)

(73) Assignees: STMicroelectronics S.r.l., Agrate Brianza (MI) (IT); STMicroelectronics SA, Montrouge (FR); STMicroelectronics Design Application GmbH, Grasbrunn (DE)

( * ) Notice: Subject to any disclaimer, the term of this patent is extended or adjusted under 35 U.S.C. 154(b) by 484 days.

(21) Appl. No.: 10/869,512

(22) Filed: Jun. 16, 2004

(65) Prior Publication Data

US 2005/0040791 A1 Feb. 24, 2005

(30) Foreign Application Priority Data

Jun. 18, 2003 (EP) .................... 03291488

(51) Int. Cl.
*H02J 7/00* (2006.01)
*H02J 7/04* (2006.01)
*H02J 7/16* (2006.01)
*G05F 1/00* (2006.01)

(52) U.S. Cl. .................. 320/135; 320/107; 320/162; 320/163; 320/132; 320/139; 323/274

(58) Field of Classification Search ............... 320/135, 320/163, 162, 107, 132; 323/274
See application file for complete search history.

(56) References Cited

U.S. PATENT DOCUMENTS

| 3,758,762 | A | | 9/1973 | Littman et al. |
| 4,714,866 | A | | 12/1987 | Sterner et al. |
| 5,311,112 | A | | 5/1994 | Kussmaul et al. |
| 5,325,041 | A | * | 6/1994 | Briggs .................. 320/149 |
| 6,307,349 | B1 | * | 10/2001 | Koenck et al. ........... 320/112 |
| 6,316,925 | B1 | * | 11/2001 | Canter ................... 323/282 |
| 2002/0047694 | A1 | | 4/2002 | Zafarana et al. |

OTHER PUBLICATIONS

Search Report dated Oct. 16, 2003 for European Application No. 03291488.

* cited by examiner

*Primary Examiner*—Edward Tso
*Assistant Examiner*—Yalkew Fantu
(74) *Attorney, Agent, or Firm*—Lisa K. Jorgenson; Stephen Bongini; Fleit Gibbons Gutman Bongini & Bianco P.L (57) ABSTRACT

A circuit is provided for controlling a battery-charger device with a closed-loop architecture. The circuit includes sensing means for sensing an operative quantity of the device, control means, and driving means. The control means alternately controls the sensing means to track the operative quantity during a tracking phase and to hold the operative quantity during a holding phase. The driving means provides a regulation signal that regulates the operative quantity based on a comparison between the operative quantity sensed by the sensing means and a reference value. The control means causes the driving means to hold the regulation signal during at least part of each of the holding phases. Also provided is a method of controlling a battery-charger device with a closed-loop architecture.

20 Claims, 4 Drawing Sheets

BATTERY-CHARGER DEVICE WITH IMPROVED STABILITY

CROSS-REFERENCE TO RELATED APPLICATIONS

This application is based upon and claims priority from European Patent Application No. 03 291 488.9, filed Jun. 18, 2003, the entire disclosure of which is herein incorporated by reference.

FIELD OF THE INVENTION

The present invention relates to a circuit for controlling a battery-charger device with a closed-loop architecture.

BACKGROUND OF THE INVENTION

Battery-supplied systems have become increasingly popular in recent years, thanks to the widespread diffusion of a number of portable devices (for example, mobile telephones). The batteries allow using such systems without the need to plug into an electrical socket. However, any battery has a limited duration (for example, some hundreds of hours), so that it must be recharged after a period of use.

Different kinds of battery-charger devices are known in the art. In one known architecture, the battery-charger implements an analog closed-loop, which is used to regulate the current that is supplied to the battery during the charging process. For this purpose, the charging current is converted into a voltage, which is measured by a corresponding sensor. The sensing voltage is compared with a reference voltage; a resulting error voltage is amplified and then used to regulate the charging current accordingly. Typically, a circuit implementing the above-described feedback loop (for controlling the battery-charger) is integrated in a chip of semiconductor material.

The sensing voltage to be measured has a very low value (on the order of some mV); moreover, the sensor suffers a significant direct current (DC) offset, which can swamp any useful sensing voltage. As a consequence, the sensor is commonly stabilized with a chopper-based technique to reduce its offset. The chopper-stabilized sensor operates in a track-and-hold (T/H) mode, under the control of a periodic clock signal. In particular, during a first half-period (tracking phase) the sensing voltage is transferred to an output of the sensor, and during a second half-period (holding phase) the sensing voltage is sampled and held. In the holding phase, the connections to a resistor used to convert the charging current into the sensing voltage are inverted, so that the opposite polarity offsets cancel.

A problem with such battery-chargers with a closed-loop architecture is in ensuring their stability. For this purpose, it is necessary to define a model simulating operation of the battery-charger. A stability analysis is then performed on that model; a compensation network (for example, consisting of a feedback capacitor) is designed by exploiting classical techniques well known in the art. An additional difficulty is due to the fact that the chopper-stabilized sensor cannot be simulated directly, but its transfer function must be linearized to represent the track-and-hold operation.

A drawback of the solution described above is that the compensation network cannot be updated once it is integrated into the control circuit of the battery-charger. Moreover, the stability of the battery-charger strongly depends on the structure of a regulator that is external to the control circuit; therefore, different control circuits must be used whenever the regulator is changed. Further, the compensation capacitor occupies a large area of the chip in which the control circuit is integrated.

SUMMARY OF THE INVENTION

It is an object of the present invention to overcome the above-mentioned drawbacks and to provide a battery-charger device with improved stability.

Another object of the present invention is to provide a circuit for controlling a battery-charger device with a closed-loop architecture.

Yet object of the present invention is to provide a method for controlling a battery-charger device with a closed-loop architecture.

One embodiment of the present invention provides a circuit for controlling a battery-charger device with a closed-loop architecture. The circuit includes sensing means for sensing an operative quantity of the device, control means, and driving means. The control means alternately controls the sensing means to track the operative quantity during a tracking phase and to hold the operative quantity during a holding phase. The driving means provides a regulation signal that regulates the operative quantity based on a comparison between the operative quantity sensed by the sensing means and a reference value. The control means causes the driving means to hold the regulation signal during at least part of each of the holding phases. Also provided is a method of controlling a battery-charger device with a closed-loop architecture.

Further embodiments of the present invention provide a battery-charger device including such a circuit, and a portable electronic system using such a battery-charger device.

Another embodiment of the present invention provides a corresponding method of controlling a battery-charger device.

Other objects, features and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
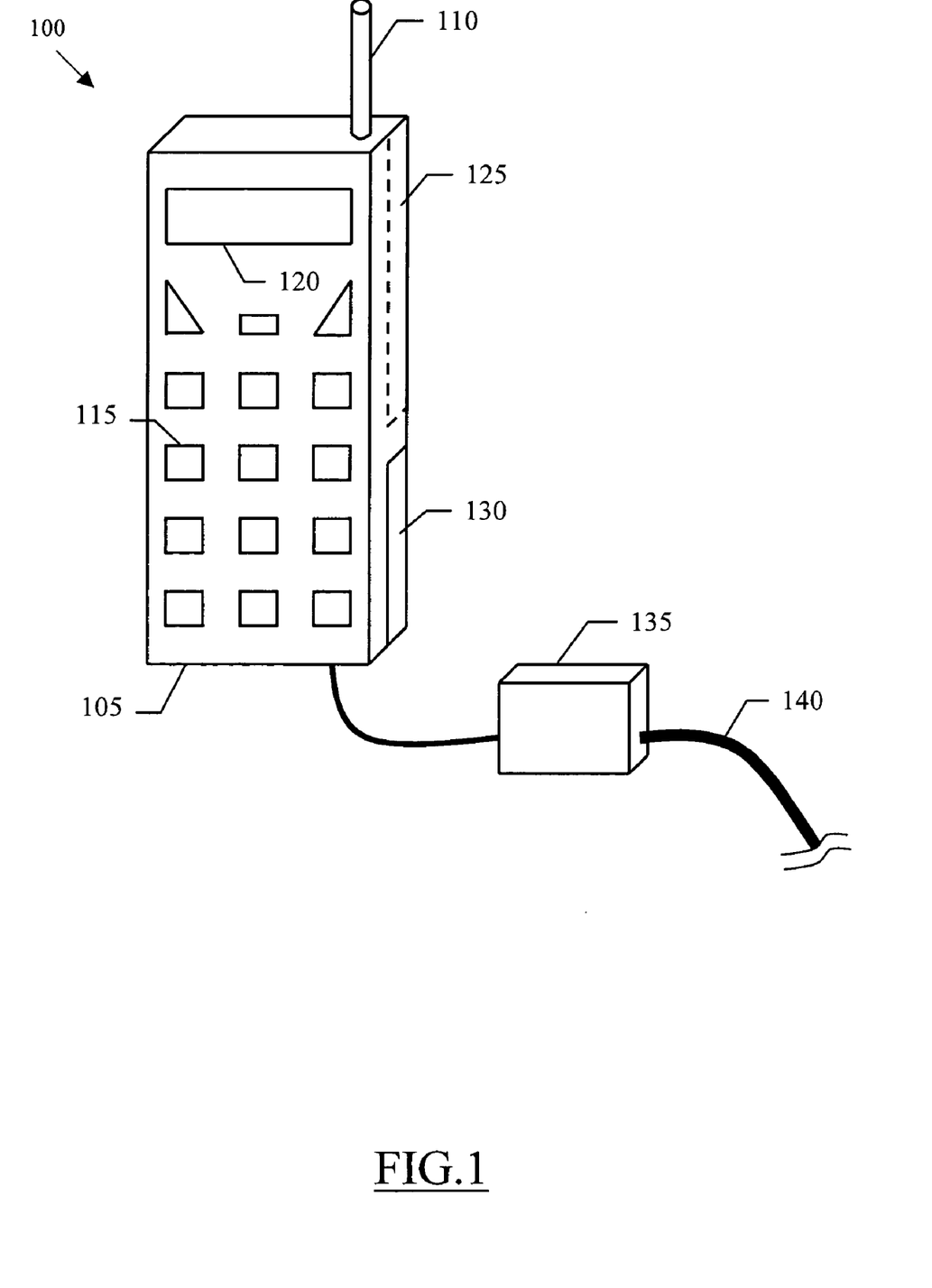
FIG. 1 is a representation of a mobile telephone that includes a battery-charger device according to a preferred embodiment of the present invention.

FIG. 1 shows a mobile telephone that includes a battery-charger device according to a preferred embodiment of the present invention. As shown, the mobile telephone 100 (for example, conforming to the GSM standard) includes a plastic shell 105, from which an antenna 110 projects upwards. The shell 105 is provided with a keypad 115 (used to dial a number, to input a message, or to control different service menus). A display 120 (showing several kinds of information, such as the number of an incoming call) is arranged above the keypad 115. An electronic circuit board 125 (placed inside the shell 105) controls operation of the telephone 100.

A battery 130 (for example, of the NiCa type) supplies the telephone 100. Whenever the battery 130 must be recharged, an AC/DC transformer 135 is connected to the telephone 100. The transformer 135 is provided with a cable 140, which is plugged into an electrical socket (not shown).

Similar considerations apply if the telephone has a different structure, if the telephone conforms to another standard, or if the battery is of a different type. Further, the concepts of the present invention are also applicable to a hand-held computer, or more generally to any portable electronic system or device.

Figure 2:
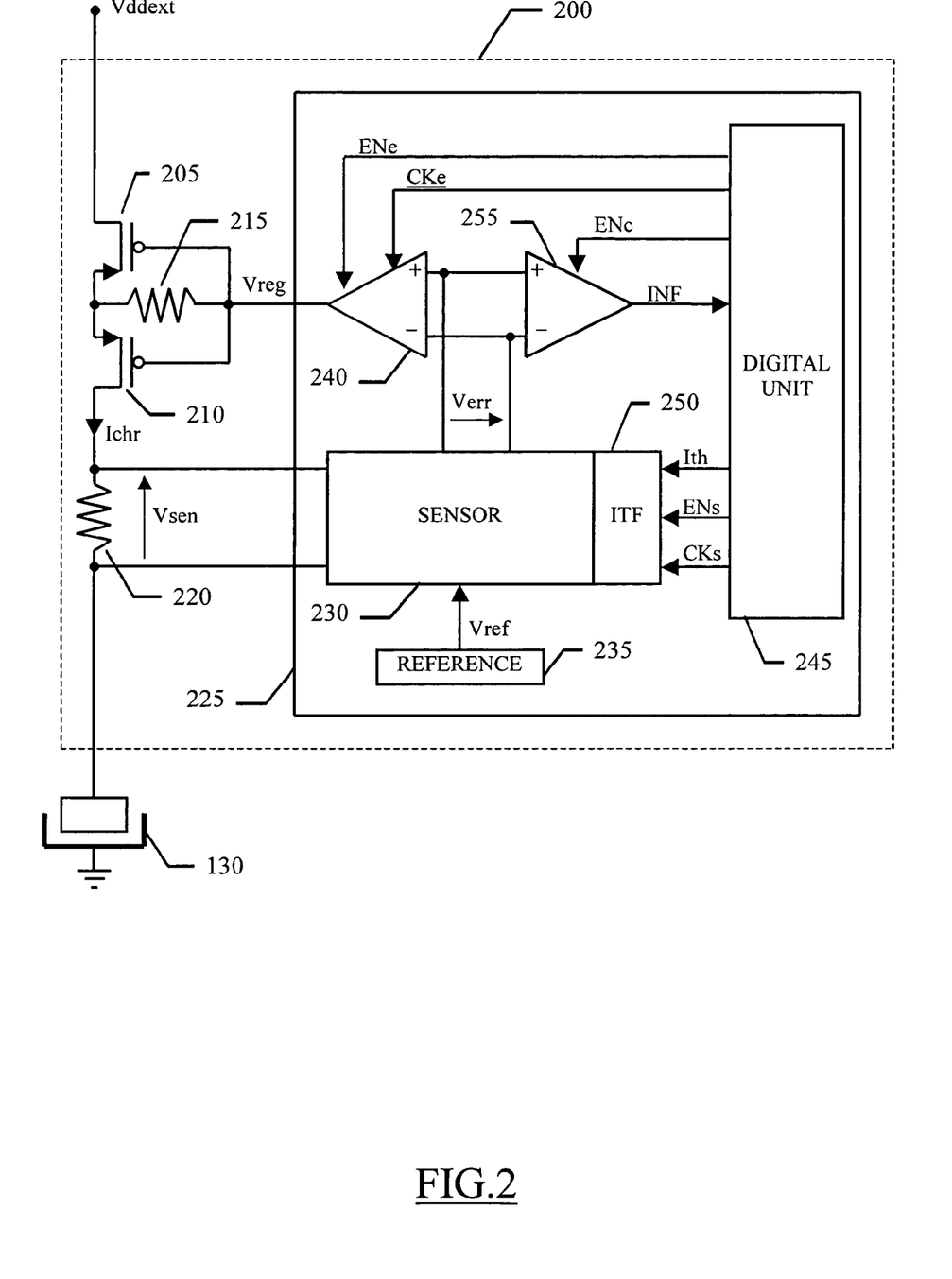
FIG. 2 is a block diagram of the battery-charger device included in the mobile telephone.

The telephone includes a battery-charger device for charging the battery 130. The battery-charger device included in the mobile telephone is shown in FIG. 2. The battery-charger device 200 receives an external voltage Vddext (for example, 5.5V with respect to a reference voltage or ground) from the transformer; a corresponding charging current Ichr is delivered to the battery 130.

Two PMOS transistors 205 and 210 in a back-to-back configuration regulate the charging current Ichr. In particular, the external voltage Vddext is supplied to the drain terminal of the first transistor 205. The first transistor 205 has its source terminal and its gate terminal connected to the source terminal and the gate terminal, respectively, of the second transistor 210. A pull-up resistor 215 is inserted between the source terminals and the gate terminals of the transistors 205 and 210. A sensing resistor 220 connects the drain terminal of the second transistor 210 to a first terminal of the battery 130 (whose second terminal is connected to a ground terminal). The first transistor 205 works in the resistive zone; the (variable) resistance of the first transistor 205 (together with the fixed resistance of the sensing resistor 220) defines the magnitude of the charging current Ichr. The second transistor 210 operates as a diode, which prevents the battery 130 from discharging through the battery-charger device 200.

The battery-charger 200 implements an analog closed-loop, in which the charging current Ichr is feedback controlled through a control circuit 225; typically, the control circuit 225 is integrated in a chip of semiconductor material. In more detail, the sensing resistor 220 converts the charging current Ichr into a corresponding sensing voltage Vsen. The control circuit 225 measures the sensing voltage Vsen and accordingly regulates the resistance of the first transistor 205 (and thus the charging current Ichr), through a regulation voltage Vreg that is supplied to the gate terminals of the transistors 205 and 210.

For this purpose, the sensing voltage Vsen is input to a sensor 230; the sensor 230 also receives a reference voltage Vref from a block 235 (for example, consisting of a band-gap circuit that provides a very accurate and temperature-insensitive reference voltage Vref). The sensor 230 outputs an error voltage Verr that is proportional to the difference between the sensing voltage Vsen and the reference voltage Vref. The error voltage Verr is amplified by an error amplifier 240, which directly supplies the regulation voltage Vreg to the gate terminals of the transistors 205 and 210.

A digital unit 245 manages operation of the control circuit 225. In particular, the digital unit 245 is coupled to the sensor 230 through a digital interface 250. The digital interface 250 receives a bit Ith, which is used to program the desired magnitude of the charging current Ichr. The digital interface 250 also receives an enabling signal ENs and a clock signal CKs (having a frequency fs and a period Ts=1/fs) for the sensor 230. Likewise, the digital unit 245 provides an enabling signal ENe and a clock signal $\underline{CKe}$ (having the same frequency as the clock signal CKs) to the error amplifier 240 (the clock signal $\underline{CKe}$ is underlined to denote that it is substantially opposed to the clock signal CKs). The control circuit 225 also includes a comparator 255. The comparator 255 receives the error voltage Verr (from the sensor 230) and generates a bit INF indicative of an operative condition of the control circuit 225; the bit INF is returned to the digital unit 245. Operation of the comparator 255 is enabled by a corresponding signal ENc supplied by the digital unit 245.

In some applications, the feedback loop is periodically opened (for example, every 8 periods of the clock signal CKs) by disconnecting the error amplifier 240 from the sensor 230. This feature is used to monitor operation of the battery-charger 200 in a steady condition (without any regulation). In any case, during the normal operation of the battery-charger 200 the error amplifier 240 is always connected to the sensor 230, and continually regulates the charging current Ichr (according to the error voltage Verr).

Similar considerations apply if the control circuit has an equivalent structure, if the charging current is detected in another way, or if the back-to-back transistors are replaced with an equivalent regulator. The concepts of the present invention are also applicable when the error voltage is generated in a different way, when the error amplifier is replaced with generic driving means (for providing an equivalent regulation signal), or when operation of the control circuit is managed in a different way. Further, the proposed solution is suitable to be used for controlling a charging voltage applied to the battery, or more generally one or more operative quantities of the battery-charger.

Figure 3:
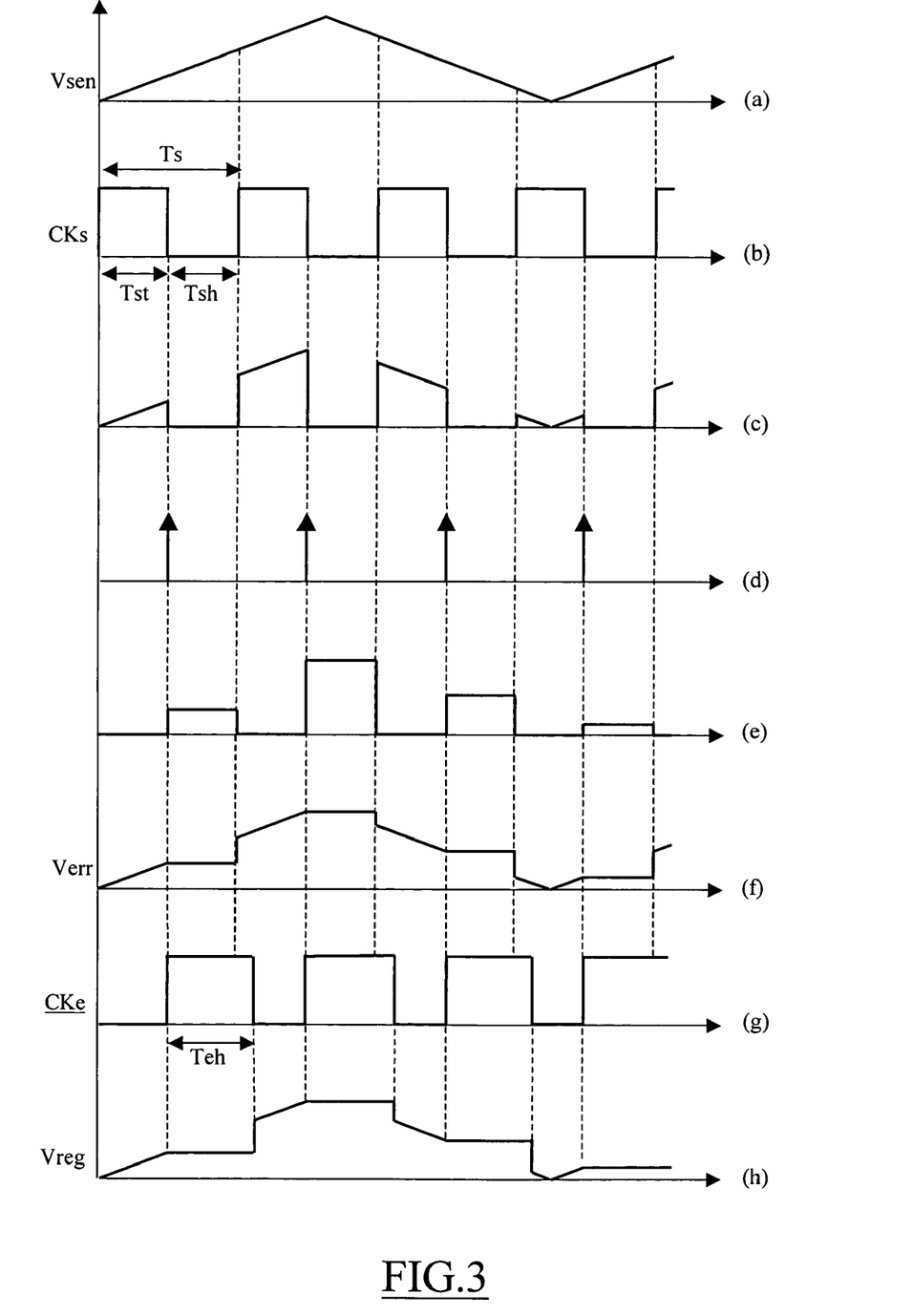
FIG. 3 shows the waveforms of relevant electrical signals in the battery-charger device.

FIG. 3 shows the waveforms of relevant electrical signals in the battery-charger device. As shown, the sensor used in the battery-charger has a chopper-stabilized structure that operates in a track-and-hold mode (under the control of the clock signal CKs). In order to explain operation of the sensor, we will now consider a generic waveform of the sensing voltage Vsen (signal a).

During a first half-period Tst of the clock signal CKs defining a tracking phase (signal b), the sensing voltage Vsen is detected and pre-amplified. In other words, the waveform of the sensing voltage Vsen is multiplied by a unit square wave function equal to 1 during each first half-period of the clock signal CKs [k·0,k·Ts/2]. Denoting with Sqr the unit square wave function, the resulting waveform (signal c) is expressed in the time domain and in the frequency domain, respectively, by the following formulas.

$$Sqr(t) \cdot Vsen(t)$$

$$Sqr(f) \circledast Vsen(f)$$

where the symbol ⊛ represents the convolution operation.

During a second half-period Tsh of the clock signal CKs (holding phase), the sensing voltage Vsen is sampled and held. In this phase, the connections to the sensing resistor are flipped; as a consequence, the polarity of any offset is inverted, so that the overall offset over each period Ts is substantially canceled. In more detail, the waveform of the sensing voltage Vsen is multiplied by a Dirac delta function consisting of a series of impulses (or comb) located at the ending of each tracking phase (signal d). The sampled waveform is then convolved with a unit square wave function equal to 1 during each second half-period of the clock signal CKs [k·Ts/2, k·Ts]. Denoting with δ(t) the Dirac delta function, the resulting waveform (signal e) is expressed in the time domain and in the frequency domain, respectively, by the following formulas.

$$\left[ Vsen(t) \cdot \sum_{k=-\infty}^{+\infty} \delta(t - k \cdot Ts) \right] \otimes \left[ Sqr\left(t - \frac{Ts}{2}\right) - Sqr(t - Ts) \right]$$

$$\left[ Vsen(f) \cdot \sum_{k=-\infty}^{+\infty} \delta(f - k \cdot fs) \right] \otimes \left[ Sqr\left(f - \frac{fs}{2}\right) - Sqr(f - fs) \right]$$

The error voltage Verr output by the sensor will correspond to the superimposition of the waveforms generated during the tracking phase and the holding phase (signal f). In particular, the waveform of the error voltage Verr can be expressed in the frequency domain as follows.

$$Verr(f) = Sqr(f) \otimes Vsen(f) +$$
$$\left[ Vsen(f) \cdot \sum_{k=-\infty}^{+\infty} \delta(f - k \cdot fs) \right] \otimes \left[ Sqr\left(f - \frac{fs}{2}\right) - Sqr(f - fs) \right]$$

Expanding the waveform of the error voltage Verr in the Fourier series, we obtain the following.

$$Verr(f) = \frac{1}{2} \cdot \sum_{k=-\infty}^{+\infty} Vsen(f - k \cdot fs) \cdot e^{-j\pi \frac{k}{2}} \cdot \frac{\sin\left(\pi \cdot \frac{k}{2}\right)}{\pi \frac{k}{2}} +$$

$$\frac{1}{2} \cdot \sum_{k=-\infty}^{+\infty} Vsen(f - k \cdot fs) \cdot e^{-j\pi \frac{f}{2 \cdot fs}} \cdot \frac{\sin\left(\pi \cdot \frac{f}{2 \cdot fs}\right)}{\pi \frac{f}{2 \cdot fs}}$$

where k represents the Fourier coefficients.

The formula can be simplified (assuming that the bandwidth of the loop is substantially lower than the frequency fs), by only taking into account the first two harmonics of the error voltage Verr (K=0 and K=1) as follows.

$$Verr(f) = \frac{1}{2} \cdot (Vsen(f) + Vsen(f - fs))e^{-j\frac{\pi}{2}} \cdot \frac{\sin\left(\frac{\pi}{2}\right)}{\frac{\pi}{2}} +$$

$$\frac{1}{2} \cdot (Vsen(f) + (Vsen(f - fs))e^{-j\pi \frac{f}{2 \cdot fs}} \cdot \frac{\sin\left(\pi \cdot \frac{f}{2 \cdot fs}\right)}{\pi \frac{f}{2 \cdot fs}}$$

As described in detail in the following, in the control circuit of the preferred embodiment the error amplifier is put in a holding mode of operation (so as to hold the regulation voltage Vreg) during each holding phase of the sensor. In this way, the transfer function of the whole loop only includes the term due to the tracking phase as follows.

$$Vreg(f) = \frac{1}{2} \cdot (Vsen(f) + Vsen(f - fs))e^{-j\frac{\pi}{2}} \cdot \frac{\sin\left(\frac{\pi}{2}\right)}{\frac{\pi}{2}}$$

In any case, the transfer function is not substantially modified. The most interesting difference is that a gain of the transfer function is attenuated by a factor of 0.5, so that the bandwidth of the loop is reduced accordingly. As a consequence, the stability of the loop is strongly improved, since the transfer function gain reaches 0 dB when its phase is far away from 180° (defining the instability condition in the Bode diagrams). It should be noted that the above-described compensation technique reduces the transfer function gain by 6 dB; in any case, this reduction does not substantially impact the quality of the regulation on the charging current Ichr in most practical applications.

Preferably, the error amplifier is also put in the holding mode during a starting part of each tracking phase. Denoting with α (from 0.5 to 1) the duty cycle of the clock signal CKe controlling the error amplifier in the holding mode and defining a phase Teh (signal g), the transfer function of the loop (signal h) will be as follows.

$$Vreg(f) = \alpha \cdot (Vsen(f) + Vsen(f - fs))e^{-j\pi} \cdot \frac{\sin(\alpha\pi)}{\alpha\pi}$$

In this way, the stability of the loop is further improved, since any transient effect caused by the switching between the holding phase and the next tracking phase of the sensor is strongly reduced. Of course, this result is achieved with an additional attenuation of the transfer function gain (in any case, sufficient to guarantee an acceptable level of regulation in most practical applications).

It is emphasized that the extent of the compensation introduced by the above-described solution only depends on the duty cycle of the clock signal CKe. Therefore, this effect can be tuned by simply programming the control circuit to change the duty cycle of the clock signal CKe as required.

Experimental results have shown that the proposed technique strongly improves the performance of the battery-charger. For example, this technique has been applied to a stable loop with a bandwidth of 65 KHz (lower than its Nyquist frequency, for example, 112.5 KHz); the loop (compensated with a capacitor of 200 pF) has a phase margin of 45° (which defines the extent of stability as the difference between 180° and the phase of the transfer function when its gain is 0 dB).

The duty cycle of the clock signal CKe has then been set to 50% (so that the error amplifier is put in the holding mode during each holding phase of the sensor), and the capacitance of the compensation capacitor has been reduced by 50% at the same time. The bandwidth of the loop is kept at 65 KHz, but the phase margin increases to 55° (with the gain that is attenuated by 6 dB). As a further optimization, the duty cycle of the clock signal CKe has been set to 62.5% (so that the error amplifier is put in the holding mode during each holding phase and the first quarter of each tracking phase of the sensor), and the capacitance of the compensation capacitor has been reduced accordingly. The bandwidth of the loop and the phase margin remains at 65 KHz and 55°, respectively (with the gain that is attenuated by 12 dB).

Similar considerations apply if the sensing voltage has a different waveform, or if the control circuit is modeled with equivalent formulas.

Figure 4:
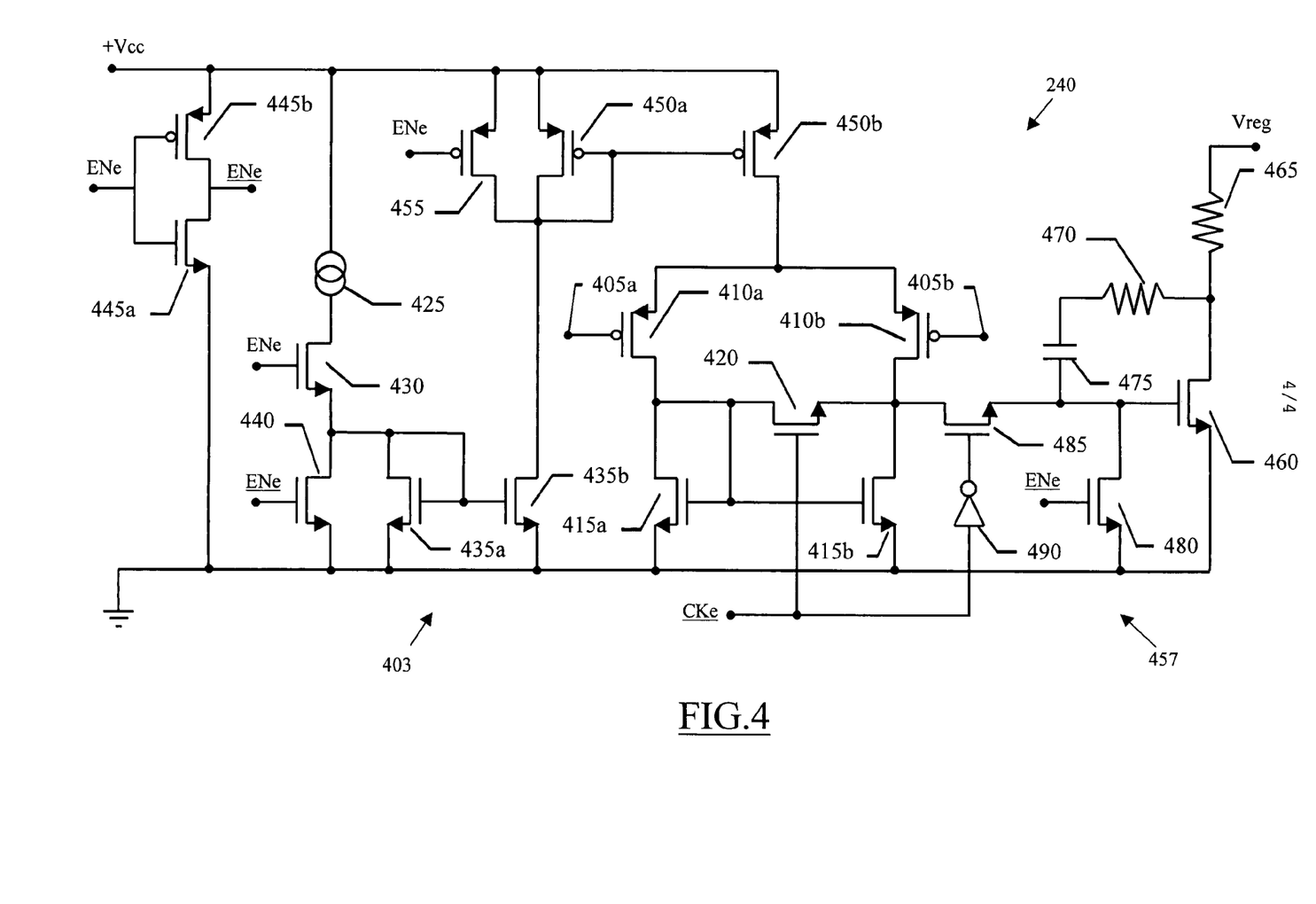
FIG. 4 is a circuit schematic of an error amplifier that is included in the battery-charger device of the preferred embodiment.

A circuit schematic for an error amplifier that implements the above-described compensation technique is shown in FIG. 4.

The exemplary error amplifier 240 includes an input stage 403 with a differential structure, which directly receives the error voltage Verr at two input terminals 405a and 405b. In more detail, the input terminal 405a is defined by the gate terminal of a PMOS transistor 410a, and the input terminal 405b is defined by the gate terminal of a further PMOS transistor 410b. The load of the transistors 410a and 410b is a current mirror formed by two NMOS transistors 415a and 415b. For this purpose, the drain terminals of the transistors 415a and 415b are connected to the drain terminals of the transistors 410a and 410b, respectively. The gate terminal of the transistor 415a is short-circuited to its drain terminal, and is connected to the gate terminal of the transistor 415b. The source terminals of both transistors 415a and 415b are connected to the ground terminal. A further NMOS transistor 420 is used to equalize the differential amplifier. The transistor 420 has its drain terminal connected to the drain terminal of the transistor 415a and its source terminal connected to the drain terminal of the transistor 415b. The gate terminal of the transistor 420 is directly controlled by the clock signal $\overline{CKe}$.

The differential amplifier is biased by a direct current provided by a generator 425. The generator 425 is arranged between a power supply terminal (providing a voltage +Vcc, for example, 1.8V) and the drain terminal of an NMOS transistor 430; the gate terminal of the transistor 430 is controlled by the enabling signal ENe.

The generator 425 is coupled (through the transistor 430) with a current mirror formed by two NMOS transistors 435a and 435b. In more detail, the source terminal of the transistor 430 is connected to the drain terminal of the transistor 435a. The gate terminal of the transistor 435a is short-circuited to its drain terminal, and is connected to the gate terminal of the transistor 435b. The source terminals of both transistors 435a and 435b are connected to the ground terminal. An additional NMOS transistor 440 has its drain terminal connected to the drain terminal of the transistor 435a and its source terminal connected to the ground terminal; the gate terminal of the transistor 440 is controlled by an inverted enabling signal $\overline{ENe}$.

The enabling signal $\overline{ENe}$ is generated by inverting the enabling signal ENe. For this purpose, the error amplifier 240 further includes an inverter formed by an NMOS transistor 445a and a PMOS transistor 445b. The transistor 445a has its source terminal connected to the ground terminal. The drain terminal of the transistor 445a is connected to the drain terminal of the transistor 445b. The source terminal of the transistor 445b is connected to the power supply terminal. The gate terminals of the transistors 445a and 445b are connected together for receiving the enabling signal ENe; the drain terminals of the transistors 445a and 445b output the (inverted) enabling signal $\overline{ENe}$.

The current mirror 435a and 435b is coupled with another current mirror formed by two PMOS transistors 450a and 450b. In particular, the drain terminal of the transistor 435b is connected to the drain terminal of the transistor 450a. The gate terminal of the transistor 450a is short-circuited to its drain terminal, and is connected to the gate terminal of the transistor 450b. The source terminals of both transistors 450a and 450b are connected to the power supply terminal. The drain terminal of the transistor 450b is then connected to the drain terminals of the transistors 410a and 410b. An additional PMOS transistor 455 has its drain terminal connected to the drain terminal of the transistor 450a and its source terminal connected to the power supply terminal; the gate terminal of the transistor 455 is controlled by the enabling signal $\overline{ENe}$.

The above-described input stage 403 is cascade connected with an output stage 457, which provides the regulation voltage Vreg. The output stage 457 includes a power NMOS transistor 460 having its source terminal connected to the ground terminal. A drain terminal of the transistor 460 is connected, through a load resistor 465, to an output terminal of the error amplifier 240 providing the regulation voltage Vreg. The output stage 457 is stabilized by a negative feedback network formed by the series of a resistor 470 and a capacitor 475 arranged between the drain terminal and the gate terminal of the transistor 460. An additional NMOS transistor 480 has its source terminal connected to the ground terminal and its drain terminal connected to the gate terminal of the transistor 460; the gate terminal of the transistor 480 is controlled by the enabling signal $\overline{ENe}$.

The input stage 403 and the output stage 457 are coupled through an NMOS transistor 485. The transistor 485 has its drain terminal connected to the drain terminal of the transistor 410b and its source terminal connected to the gate terminal of the transistor 460. The gate terminal of the transistor 485 is controlled by the clock signal $\overline{CKe}$ through an inverter 490.

In a rest condition of the error amplifier 240, the enabling signals ENe and $\overline{ENe}$ are de-asserted (i.e., ENe=0V and $\overline{ENe}$=+Vcc). In this condition, the transistor 430 is off and the transistors 440, 455, and 480 are on, so as to reduce any power consumption in the error amplifier 240. The error amplifier is enabled by asserting the signals ENe and $\overline{ENe}$ (i.e., ENe=+Vcc and $\overline{ENe}$=0V). As a consequence, the transistor 430 is turned on and the transistors 440, 445, and 480 are turned off. The biasing current provided by the generator 425 is then mirrored (through the structures 435a-435b and 450a-450b) towards the differential amplifier 410a-410b.

During the normal operation of the error amplifier 240, the clock signal $\overline{CKe}$ is at the low level (0V). Therefore, the transistor 420 is off and the transistor 485 is on. The stages 403 and 457 are then connected to each other, so that the error voltage Verr is amplified to generate the regulation voltage Vreg accordingly. In this phase, the capacitor 475 charges through the resistor 470.

As soon as the error amplifier is put in the holding mode (clock signal $\overline{CKe}$ at high level, i.e., +Vcc), the transistor 420 is turned on and the transistor 485 is turned off. As a consequence, the output stage 457 is insulated from the input stage 403. In this condition, the capacitor 475 is equivalent to an input capacitor with a very high capacitance (because of the Miller effect); therefore, the capacitor 475 holds an input voltage of the output stage 457 (and then also the regulation voltage Vreg) at the value before entering the holding mode.

Similar considerations apply if the error amplifier has a different architecture or includes equivalent components. The concepts of the present invention are also applicable when each stage has a different structure, or when the error amplifier is put in the holding mode in an equivalent manner.

In general, the present invention proposes a circuit for controlling a battery-charger device with a closed-loop architecture. The circuit includes sensing means for sensing an operative quantity of the device. The sensing means is alternately controlled to track the operative quantity during a tracking phase and to hold the operative quantity during a holding phase. Driving means is used for providing a regulation signal (for regulating the operative quantity) according to a comparison between the sensed operative quantity and a reference value. The circuit further includes means for causing the driving means to hold the regulation signal during at least part of each holding phase.

The proposed solution is extremely flexible, since the extent of the compensation introduced by the holding of the regulation signal can be tuned in a very simple manner.

Therefore, the same circuit can be programmed for use with a wide range of external components (regulating the desired quantity of the battery-charger device).

Moreover, this structure strongly reduces the area occupied by any compensation network included in the circuit.

The preferred embodiment of the present invention described above offers further advantages.

Particularly, the error amplifier is put in the holding mode during at least each holding phase of the sensor.

This provides excellent performance for the proposed technique.

As an additional enhancement, the error amplifier is put in the holding mode during each holding phase and a starting part of each tracking phase of the sensor.

This feature further improves the stability of the loop (thanks to the reduction of any transient effect caused by the switching between the holding phase and the next tracking phase).

The solution according to the present invention can be implemented such that the error amplifier is put in the holding mode during the holding phase and an ending part of the tracking phase, only during the holding phase, or even during a part thereof.

In a preferred embodiment of the present invention, the error amplifier is put in the holding mode according to the duty cycle of the corresponding clock signal provided by the digital unit.

In this way, the tuning of the control circuit is strongly simplified.

Preferably, the error amplifier includes an input stage and an output stage (with a compensation capacitor connected in feedback); the error amplifier is put in the holding mode by disconnecting the two stages.

This proposed implementation exploits a component already available, and requires only small changes to the error amplifier.

Alternatively, the error amplifier can be put in the holding mode in a different way or by using dedicated components, the error amplifier can have another structure (even with a single stage), or the proposed technique can be implemented elsewhere within the control circuit.

The control circuit of the present invention is used in a battery-charger device.

However, the control circuit can be put on the market as a stand-alone product.

Typically, the battery-charger device is included in a portable electronic system that is supplied by a battery.

In any case, the battery-charger device can be external to the system and can be put on the market separately (even for use in different applications).

The present invention can be realized in hardware, software, or a combination of hardware and software. Any processor, controller, or other apparatus adapted for carrying out the functionality described herein is suitable. A typical combination of hardware and software could include a general purpose processor (or a controller) with a computer program that, when loaded and executed, carries out the functionality described herein.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A circuit for controlling a battery-charger device with a closed-loop architecture, the circuit comprising:
   sensing means for sensing an operative quantity of the device and comparing the operative quantity that is sensed with a reference value;
   control means for controlling the sensing means such that the sensing means alternately tracks the operative quantity during a tracking phase and holds the operative quantity during a holding phase; and
   driving means for generating a regulation signal so as to regulate the operative quantity based on a result of the comparison by the sensing means,
   wherein the control means controls the driving means such that the driving means holds the regulation signal during at least part of each of the holding phases during which the sensing means holds the operative quantity.

2. The circuit according to claim 1, wherein the control means controls the driving means such that the driving means holds the regulation signal during all of each of the holding phases.

3. The circuit according to claim 1, wherein the control means controls the driving means such that the driving means holds the regulation signal during all of each of the holding phases and during a starting part of each of the tracking phases.

4. The circuit according to claim 1, wherein the control means provides a clock signal to the driving means, the driving means holding the regulation signal according to a duty-cycle of the clock signal.

5. The circuit according to claim 4,
   wherein the sensing means provides an error signal indicative of the result of the comparison between the operative quantity that is sensed and the reference value, and
   the driving means includes an amplifier for generating the regulation signal by amplifying the error signal, the amplifier including an input stage for receiving the error signal, an output stage for providing the regulation signal, capacitive means connected in feedback to the output stage, and means responsive to the clock signal for disconnecting the output stage from the input stage.

6. The circuit according to claim 1, wherein the operative quantity is a charging current for charging a battery.

7. A battery-charger device with a closed-loop architecture, said battery-charger device comprising:
   a sensing circuit for sensing an operative quantity of the device and comparing the operative quantity that is sensed with a reference value;
   a control circuit for controlling the sensing circuit such that the sensing circuit alternately tracks the operative quantity during a tracking phase and holds the operative quantity during a holding phase;
   a regulation circuit for regulating the operative quantity in response to a regulation signal; and
   a driving circuit for generating the regulation signal and providing the regulation signal to the regulation circuit so as to regulate the operative quantity based on a result of the comparison by the sensing circuit;

wherein the control circuit controls the driving circuit such that the driving circuit holds the regulation signal during at least part of each of the holding phases during which the sensing circuit holds the operative quantity.

8. The battery-charger device according to claim 7, wherein the control circuit controls the driving circuit such that the driving circuit holds the regulation signal during all of each of the holding phases.

9. The battery-charger device according to claim 7, wherein the control circuit controls the driving circuit such that the driving circuit holds the regulation signal during all of each of the holding phases and during a starting part of each of the tracking phases.

10. The battery-charger device according to claim 7, wherein the control circuit provides a clock signal to the driving circuit, the driving circuit holding the regulation signal according to a duty-cycle of the clock signal.

11. The battery-charger device according to claim 10, wherein the sensing circuit provides an error signal indicative of the result of the comparison between the operative quantity that is sensed and the reference value, and the driving circuit includes an amplifier for generating the regulation signal by amplifying the error signal, the amplifier including an input stage for receiving the error signal, an output stage for providing the regulation signal, capacitive means connected in feedback to the output stage, and means responsive to the clock signal for disconnecting the output stage from the input stage.

12. The battery-charger device according to claim 7, wherein the operative quantity is a charging current for charging a battery.

13. A portable electronic system comprising:

a functional unit;

a battery coupled to the functional unit for supplying power to the functional unit; and the battery-charger device according to claim 7 for charging the battery.

14. A method of controlling a battery-charger device with a closed-loop architecture, said method comprising:

sensing an operative quantity of the device so as to alternately track the operative quantity during a tracking phase and hold the operative quantity during a holding phase;

comparing the operative quantity that is sensed with a reference value;

generating a regulation signal so as to regulate the operative quantity based on a result of the comparison between the operative quantity that is sensed and the reference value; and holding the regulation signal during at least part of each of the holding phases during which the operative quantity is held.

15. The method according to claim 14, wherein in the holding step, the regulation signal is held during all of each of the holding phases.

16. The method according to claim 14, wherein in the holding step, the regulation signal is held during all of each of the holding phases and a starting part of each of the tracking phases.

17. The method according to claim 14, wherein the comparing step includes generating an error signal indicative of the result of the comparison; and the generating step includes generating the regulation signal by amplifying the error signal.

18. The method according to claim 14, further comprising the step of regulating the operative quantity in response to the regulation signal.

19. The method according to claim 14, wherein the operative quantity is a charging current for charging a battery.

20. The circuit according to claim 1, further comprising reference voltage generating means for generating a reference voltage, the reference voltage being the reference value.

* * * * *